May 25, 1937.   B. H. ANIBAL   2,081,213
ENGINE STABILIZER
Filed May 28, 1934
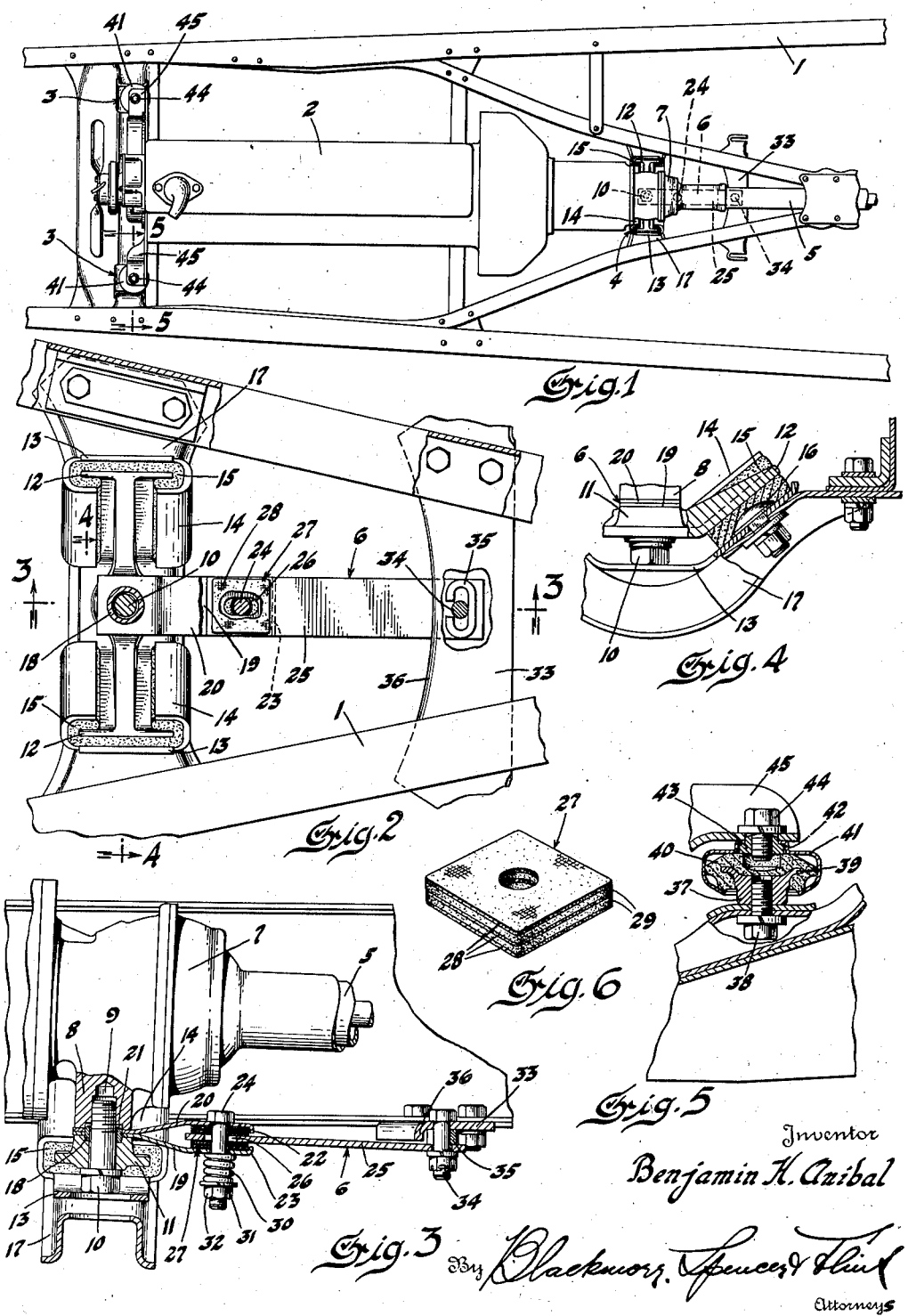
Inventor
Benjamin H. Anibal
By Blackmore, Spencer & Flint
Attorneys Patented May 25, 1937

2,081,213

UNITED STATES PATENT OFFICE 2,081,213

ENGINE STABILIZER

Benjamin H. Anibal, Pontiac, Mich., assignor to General Motors Corporation, Detroit, Mich., a corporation of Delaware Application May 28, 1934, Serial No. 727,902

6 Claims. (Cl. 248—7)

This invention relates to a longitudinal movement resistor for automobile motors and more specifically to means for minimizing longitudinal shift of a motor which is mounted resiliently in the frame of the vehicle.

In automobile motors that are mounted in the frame on rubber pads to prevent the vibration of the motor from being transmitted to the car body, it has been found that with a sudden application of the brakes or a sudden acceleration of power there is considerable longitudinal movement of the motor. It is necessary to make the actual mountings of such a structure that they will allow this movement in order that they may be sufficiently resilient to absorb the shocks or vibrations of the motor.

It is therefore the object of this invention to provide a separate means for resisting or damping out this longitudinal motion. Further objects and advantages will be apparent in the description as set forth in the specification and claims and illustrated in the drawing, in which:

Figure 1 is a top plan view of a motor resiliently mounted in a frame showing my resistor in place.

Figure 2 is an enlarged top plan detail showing the resistor and its connections, parts being shown in section.

Figure 3 is a section taken on line 3—3 of Figure 2.

Figure 4 is a section taken on line 4—4 of Figure 2 with parts broken away.

Figure 5 is a section taken on the line 5—5 of Figure 1.

Figure 6 is a detailed view of one of the resilient friction pads used in my invention.

Referring to Figure 1, the numeral 1 indicates a frame member on which is supported the motor 2 at two points of suspension 3 at its forward end, and a single point 4 at the rear. Extending to the rear of this last mentioned point is the drive shaft housing 5 beneath which, shown in dotted lines, is the resistor 6.

The rear engine mounting, shown more in detail in Figure 2, is the subject matter of, and is described in detail in the copending application of John H. Keller, Serial No. 729,202 filed June 6, 1934, now Patent No. 2,039,007 of April 28, 1936. On the lower portion of the universal casing 7 and cast integral therewith is a downwardly projecting portion 8 which has a hole 9 drilled and tapped for cap screw 10. A supporting member 11, which is bent longitudinally into a U-shape, has end portions 12 that are of inverted T-shape in cross section. At the middle or lowest point in the U of this member there is provided a hole through which the cap screw is inserted to secure this member to the housing case. To the two outer ends of this member are secured the two ends of a second U-shaped member 13 which is provided with wide end portions 14 upon which a layer of resilient material 15 is placed and then the whole folded over to include the inverted T-shaped ends of the first member to secure the two together and yet keep a layer of resilient material between the two at all points. The lower member is bolted, as at 16, to a cross frame member 17.

Upon the bolt 10, between the upper U-shaped member and the projection 8 are secured a washer 18 and the two forward brackets 19 and 20 of the resistor. Both the projecting member and the U-shaped member are hollowed out, as shown at 21, to form a seat for the washer, which fits tightly around the screw. Both of the brackets 19 and 20 have a larger opening therein which fits around the outside of the washer. The two brackets lie in face to face contact throughout the area covered by the surface of the U-shaped portion and the projection on the casing. As they emerge from this position the upper bracket is offset upwardly and the bottom downwardly so that they diverge from each other. Then they are again bent so that they are parallel but, of course, they will now be spaced apart. The extreme end portions are bent down and up respectively, as shown at 22 and 23, to form a semi-enclosure. Through the two straps in the middle of their spaced parallel portion extends a bolt 24 through suitable holes supplied therein. Also secured by the bolt and located between the two bracket members is the rear resistor member or strap 25. The opening 26 in the member 25 through which the bolt 24 passes is an elongated one in the plane of the strap which allows relative movement forward and back. Between each side of the strap and the end of the forward bracket member is a resilient friction pad 27. Each of these pads is made up of three layers of brake lining material 28 with a layer of rubber 29 between the layers of brake lining.

Upon the end of the bolt is located a coil spring 30, one end of which appears against the underside of the lower forward bracket and the other against washer 31 which is held in place by nut 32. Therefore the tension on the spring may be varied which will, of course, vary the pressure between the pads 27 and the strap.

The rear end of the strap 25 is secured to the brake cross shaft supporting plate 33 by a bolt 34 and the plate is in turn bolted to a frame member 1. Surrounding the bolt 34 is an elongated C-shaped washer 35 which extends the full width of the strap and has sufficient thickness to carry the strap below the rolled front 36 of the supporting plate 33.

The mountings for the front of the motor 2, are shown in detail in Figure 5. To a part of the frame 1 is secured a member 37 by a bolt 38. The upper portion of the member 37 is flared out to form a rim 39. Fitting snugly around this rim is a molded piece of rubber 40 and surrounding the rubber, but spaced from the member 37, is a metal shell 41. The top of this shell has an offset portion 42 in which is held a nut 43. A bolt 44 secures this top nut to a motor supporting arm 45. It will be seen from the foregoing that the arms and frame are separated at all points by rubber.

The action of the resistor or snubber may be described as follows: if the motor should tend to shift longitudinally of the frame, the bolt 24 may slide in the slot 26 but the force of coil spring 30 presses the layers of brake lining against each side of the strap which tends to resist or damp the movement. The layers of rubber in the pads tend to absorb the vibration and prevent its being transmitted to the frame. The C-shaped washer which is used to secure the rear end of the strap to the brake supporting plate tends to prevent any side tipping of the strap since it extends for the full width of the strap.

It will therefore be seen that I have provided a simple, economical and efficient device for resisting or damping out the longitudinal movement of a resiliently supported motor.

I claim:

1. An independent longitudinal movement resistor having no supporting action for a motor resiliently mounted in a frame comprising two diverging arms secured to the motor and extending longitudinally thereof, a longitudinally extending strap secured to the frame and having its opposite end extending between the diverging arms and connected thereto through a lost motion connection to allow relative movement, and means secured between each of the arms and the strap end to resist relative longitudinal movement between the arms and strap.

2. An independent longitudinal movement resistor having no supporting action for a motor resiliently mounted in a frame comprising two longitudinally extending diverging arms secured to the motor, two resilient friction pads carried by the arms, a longitudinally extending strap positioned between the pads and secured to the frame, an elongated opening in the strap through which a bolt is passed to secure the strap between the divergent arms, whereby there may be some longitudinal movement between the two parts but resisted by the friction pads.

3. An independent longitudinal movement resistor having no supporting action for a motor resiliently mounted in a frame comprising two longitudinally extending diverging arms secured to the motor, two resilient friction pads carried by the arms, a longitudinally extending strap positioned between the pads and secured to the frame, an elongated opening in the strap through which a bolt is passed to secure the strap between the divergent arms, a spring on the bolt shaft which presses the diverging arms together whereby there may be some longitudinal movement between the arms and the strap, but damped by the pads, the amount of damping being dependent on the pressure of the spring.

4. A longitudinal movement resistor for a motor resiliently mounted in a frame comprising two diverging arms secured to the motor, two pads carried by the arms consisting of alternate layers of brake lining and sheets of rubber, the brake lining being next to the metal parts, a single strap positioned between the pads and secured to the frame, an elongated opening in the strap through which a bolt extends to secure the strap between the divergent arms, whereby there may be some longitudinal movement between the arms and the strap but it is damped by the pads.

5. A longitudinal movement resistor for a motor resiliently mounted in a frame comprising two divergent arms secured to the motor, two pads secured to the arms and consisting of alternate layers of brake lining and sheets of rubber, the brake lining being next to the metal parts, a single strap positioned between the pads and secured to the frame, an elongated opening in the strap through which a bolt extends to secure the strap between the divergent arms, a spring on the bolt shaft which presses the diverging arms together, whereby there may be some longitudinal movement between the arms and the strap but damped by the pads, the amount of damping being dependent on the presure of the spring.

6. In a device for resisting longitudinal relative movement of the two parts of a composite member having one section that has two arms which encompass the end of the second section, a pad carried by each of the arms and positioned between that arm and the end of the second section, said pad composed of a layer of brake lining then a layer of rubber, then a second layer of brake lining and a second layer of rubber, then a third layer of brake lining, whereby there will be a layer of brake lining against the arm and strap to oppose movement with two separated rubber layers for resiliency.

BENJAMIN H. ANIBAL.